(12) United States Patent
Berger et al.

(10) Patent No.: US 12,487,011 B1
(45) Date of Patent: Dec. 2, 2025

(54) RENEWABLE GEOBATTERY ENERGY STORAGE

(71) Applicants: Eric L Berger, Bakersfield, CA (US); Paul E Harness, Bakersfield, CA (US); Frank Lawrence, Bakersfield, CA (US)

(72) Inventors: Eric L Berger, Bakersfield, CA (US); Paul E Harness, Bakersfield, CA (US); Frank Lawrence, Bakersfield, CA (US)

(*) Notice: Subject to any disclaimer, the term of this patent is extended or adjusted under 35 U.S.C. 154(b) by 0 days.

(21) Appl. No.: 18/792,046

(22) Filed: Aug. 1, 2024

Related U.S. Application Data

(63) Continuation-in-part of application No. 18/123,969, filed on Mar. 20, 2023, now Pat. No. 12,085,313, which is a continuation-in-part of application No. 17/684,575, filed on Mar. 2, 2022, now abandoned.

(60) Provisional application No. 63/218,683, filed on Jul. 6, 2021, provisional application No. 63/157,509, filed on Mar. 5, 2021.

(51) Int. Cl.
| | |
|---|---|
| *F24T 10/30* | (2018.01) |
| *B65G 5/00* | (2006.01) |
| *F24S 60/30* | (2018.01) |
| *H02J 15/00* | (2006.01) |
| *H02N 11/00* | (2006.01) |
| *F28D 20/00* | (2006.01) |

(52) U.S. Cl.
CPC ............. *F24T 10/30* (2018.05); *B65G 5/005* (2013.01); *F24S 60/30* (2018.05); *H02J 15/00* (2013.01); *H02N 11/002* (2013.01); *F28D 20/0052* (2013.01)

(58) Field of Classification Search
CPC .......... F24T 10/30; F24T 10/20; B65G 5/005; F24S 60/30; F24S 20/20; H02J 15/00; H02N 11/002; Y02E 10/10; Y02E 70/30; Y02E 10/40; Y02E 60/14; F28D 20/0052; F03G 7/04
See application file for complete search history.

(56) References Cited

U.S. PATENT DOCUMENTS

| | | | | |
|---|---|---|---|---|
| 5,282,384 | A * | 2/1994 | Holbrook | E21B 21/08 |
| | | | | 73/382 R |
| 5,685,362 | A * | 11/1997 | Brown | F24T 10/20 |
| | | | | 165/45 |
| 8,109,094 | B2 * | 2/2012 | Petty | F24T 10/20 |
| | | | | 60/641.2 |
| 2006/0048770 | A1 * | 3/2006 | Meksvanh | F24T 10/20 |
| | | | | 126/620 |

(Continued)

*Primary Examiner* — Wesley G Harris
(74) *Attorney, Agent, or Firm* — Roy L Anderson

(57) ABSTRACT

Excess energy generated from renewable energy (solar or wind sources) is used to heat a liquid which is injected into a naturally-occurring permeable, porous subterranean reservoir where it heats constituent reservoir grain matrix, thereby storing energy and modifying the reservoir's storage capacity and transmissibility, and energy is recovered, as demands require, by producing hot reservoir fluids whose heat is transformed into electric power. By using water heated to at least 250° F., thermal stresses are induced to create a measurable increase of units of permeability (at least double, but up to tenfold or more), as well as an increase in porosity (up to 10 volume %) between a pair of wells located more than fifty meters apart as the reservoir is heated to in excess of approximately 500° F.

3 Claims, 11 Drawing Sheets

(56) References Cited

U.S. PATENT DOCUMENTS

2010/0071366 A1\* 3/2010 Klemencic .............. F24T 10/20
   60/641.2
2017/0102192 A1\* 4/2017 Olsen ................... F28D 20/021

\* cited by examiner 0.004 ft

RENEWABLE GEOBATTERY ENERGY STORAGE

CROSS REFERENCE TO RELATED APPLICATIONS

This application is a continuation-in-part application of U.S. Ser. No. 18/123,969, filed Mar. 20, 2023, which is a continuation-in-part application of U.S. Ser. No. 17/684,575, filed 03-02022, which claims priority from two provisional applications, U.S. Ser. No. 157,509, filed Mar. 5, 2021, and U.S. Ser. No. 63/218,683, filed Jul. 6, 2021, the disclosures of all of which are specifically incorporated herein by reference in their entireties.

FIELD OF THE INVENTION

The present invention is in the field of storing and recovering energy generated from renewable energy sources.

BACKGROUND OF THE INVENTION

Naturally-occurring geothermal energy (NOGE) has been in use by humanity for several thousand years. NOGE has existed by there being variations in the earth's crust, which has allowed molten rock (10,000 F) to come near enough to the surface, near human habitation, where tectonic forces have been sufficient to ubiquitously fracture the crust overlaying this near-molten rock anomaly, and where water has been available to penetrate the earth's crust and into these fractures to allow the water to become very hot. Natural emanations of these heated waters, as in hot-springs, mud baths and geysers, have identified the presence of these required conditions. In recent times, and with skills learned in the drilling of water and oil wells, NOGE, at greater depths, has been available to be tapped for commercial uses. NOGE, for production of electric power in the USA, has been in use for decades. For economic electric power production geothermal energy must exist in sufficient quantity and, since power is defined as the rate of transferring energy, must be producible in sufficient rate to allow commercial power production and sales. In every case, NOGE heating of waters has been limited by the availability of invading waters, and by the ability of the rock to transfer heat to said waters. Recent development in NOGE power generation has attempted to reduce the limitation regarding water availability through the injection of produced waters. In so doing, it has become clear that the heat transfer process is now the limiting factor as NOGE installations mature. Old NOGE electric power installations have lost much of their capacities as the heat from the heat supplying rock has been depleted by the heat extraction processes used for this purpose.

The desire to create synthetic geothermal energy (SGE) as a means of replacing and expanding on NOGE systems, has arisen as a means of eliminating combustible fuels for the production of electric power, and for other heating purposes. However, the same limitations that impact NOGE also impact SGE. There have been many locations of naturally occurring hot rock, which are devoid of widespread tectonic fracturing and invading waters (known as Hot Dry Rock, or HDR), which have been identified as being a means for applying NOGE power production know-how, extended by oil-industrial know-how in the use of rock fracturing and water injecting methods. Further inquiry into this concept demonstrates its ineffectiveness. HDR possess no practical permeability (the ability to transport fluids through the rock), and therefore must be considered as solid rock which transfers heat across exposed fracture faces. In all such circumstances used for recovering heat through the extraction of native or injected waters, the heat transfer process is ultimately limited by the conductivity of the rock. This limitation has been described in heat transfer textbooks and papers as being governed by various rock property parameters (thermal heat capacity, the amount of energy a material can hold, and thermal conductivity, the rate at which heat moves through a material), but the decline in available heat delivery rate is limited by the duration that heat is extracted from the earth, to wit, $Heat_{available} \propto time^{-1/2}$. In all cases, transient heat conduction limits the availability of heat conveyance. This relationship is shown by the chart in FIG. 1. As the chart in FIG. 1 shows, within about three years (>1000 days) after initiation of maximal heat recovery from a naturally occurring hot rock, the available heat for process use will be reduced by more than 95%, limited by the rock's tendency to act more as an insulator than a conductor of heat. This concept is understandable by the amount of heat trapped in the core of the earth, whereby the core has a temperature of about 10000 F, yet this heat has not escaped into heat-absent space, even after the billions of years the earth has been in existence; i.e., the earth's rock material is an effective insulator.

One may simply suggest that the depleting greater volumes of rock may be the answer to this limitation. However, the rate at which heat may be transferred is also limited by the amount of waters to be injected into the rock for the transport of energy, and by the synthetically-induced fracture surface area. Heat transfer rate, when conduction limited, is proportional to the ratio of surface area used to transfer heat and the volume of rock which stores the heat (i.e, Surface Area:Volume Ratio—SVR). The SVR is calculated by dividing the apparent surface area by the affected volume. Since the geometries are based on area and thickness, the SVR for a fractured rock is defined as being $thickness_{affected}^{-1}$. This ratio can be seen in the limiting case as being about 1/70 as can be seen by the chart set forth in FIG. 2, which shows the depletion distance away from the surface area of a fracture after about 1000 days, is an asymptotic depth (distance) of about 70 feet. This SVR is commercially low, making the application of SGE methods, where the goal is to extract heat at high rates from HDR, uneconomic.

In both NOGE and typically-described SGE processes, the extracted waters are flashed into saturated steam by reducing the pressure at the extracting wellheads. In so doing, the reservoir waters, as they rapidly evaporate, or flash, are greatly accelerated causing vapor velocity-induced wellbore damage and transport of free solids into the wellbore, causing further solids erosion-induced wellbore damage, and failure. Further, the evaporation of water into vapor concentrates dissolved solids in the remaining liquid phase. Typically, the concentration of solids in the unflashed liquid phase exceed that liquid water's ability to keep the solids in solution, which results in scale deposition in the reservoir and the wellbore and subsequent processing and piping systems, greatly reducing system operability, and both heat and mass transport through the reservoir, the wellbore and surface processing equipment; i.e., the system's ability to make power.

Another concept associated with HDR SGE calls for the introduction of heat collected at the surface, whereby the injected waters planned for the purpose would be heated to industrially useful temperatures and recharge the HDR energy state. Unfortunately, the heat transfer limiting processes which interfere with collecting useful amounts of heat in waters also limit their usefulness in transferring heat back into HDR, where the SVR remains as described above.

SUMMARY OF THE INVENTION

The present invention is generally directed to a system and process for storing and recovering energy derived from a renewable energy (e.g., solar or wind based energy technologies) which is used to heat a liquid (e.g., water) that is injected into a naturally-occurring, permeable, porous or ubiquitously fractured subterranean reservoir where it heats the grain matrix so as to store heat for subsequent use which is recovered by producing hot reservoir fluid from the reservoir and transforming its heat into electrical power. This process allows for excess electricity generated from renewable energy sources to be stored during peak energy production periods, or over longer time spans, in existing geological reservoirs.

The present invention uses a heated liquid (e.g., water heated to at least 250° F.) which is heated to a temperature at which it will induce thermal stresses and will be an effective solvent for enhancing permeability and porosity of the naturally-occurring, permeable, porous subterranean reservoir serviced by an array of wells (located more than approximately 50 meters apart, and preferably approximately 71 meters apart), to create a measurable increase of units of permeability (at least double, but up to tenfold or more), as well as an increase in porosity (up to 10 volume %) between a pair of wells as the reservoir is heated (e.g., to in excess of approximately 500° F.).

The present invention supports commercial storage and recovery of a renewable energy through use of a produced fluids circulation loop in a naturally-occurring, permeable, porous subterranean reservoir configured with grain matrix rock and reservoir fluid, a solar heating loop, an electric power loop and an array of injection and producing wells configured to deliver heat into the reservoir by an injectant fluid and recover heat from the reservoir by a recovery fluid. The produced fluids circulation loop and the solar heating circulation loop are associated by a first heat exchanger to transfer heat to the reservoir fluid and store heat in the grain matrix rock while the produced fluids circulation loop and the electric power loop are associated by a second heat exchanger to transfer heat from the reservoir fluid and generate electricity. Injectant delivery rates of the array are managed to keep an injection process within elastic limits of the reservoir grain matrix's rupture strength and prevent flashing of the injectant fluid, the recovery fluid and the reservoir fluid. Over a period of time, the reservoir is heated from an initial temperature to an elevated reservoir temperature by the injection process and the elevated reservoir temperature supports power generation from the recovery fluid.

Accordingly, it is a primary object of the present invention to provide improved storage and recovery of energy generated from renewable energy sources.

This and further objects and advantages will be apparent to those skilled in the art in connection with the drawings and the detailed description of the invention set forth below.

BRIEF DESCRIPTION OF THE DRAWINGS

FIG. 1 is a chart showing transient conduction effects of time on heat transferred while

FIG. 3A is an illustration of porous rock in which there are interstices in a grain matric before application of heat and fluids while

DETAILED DESCRIPTION OF THE INVENTION

Figure 1:
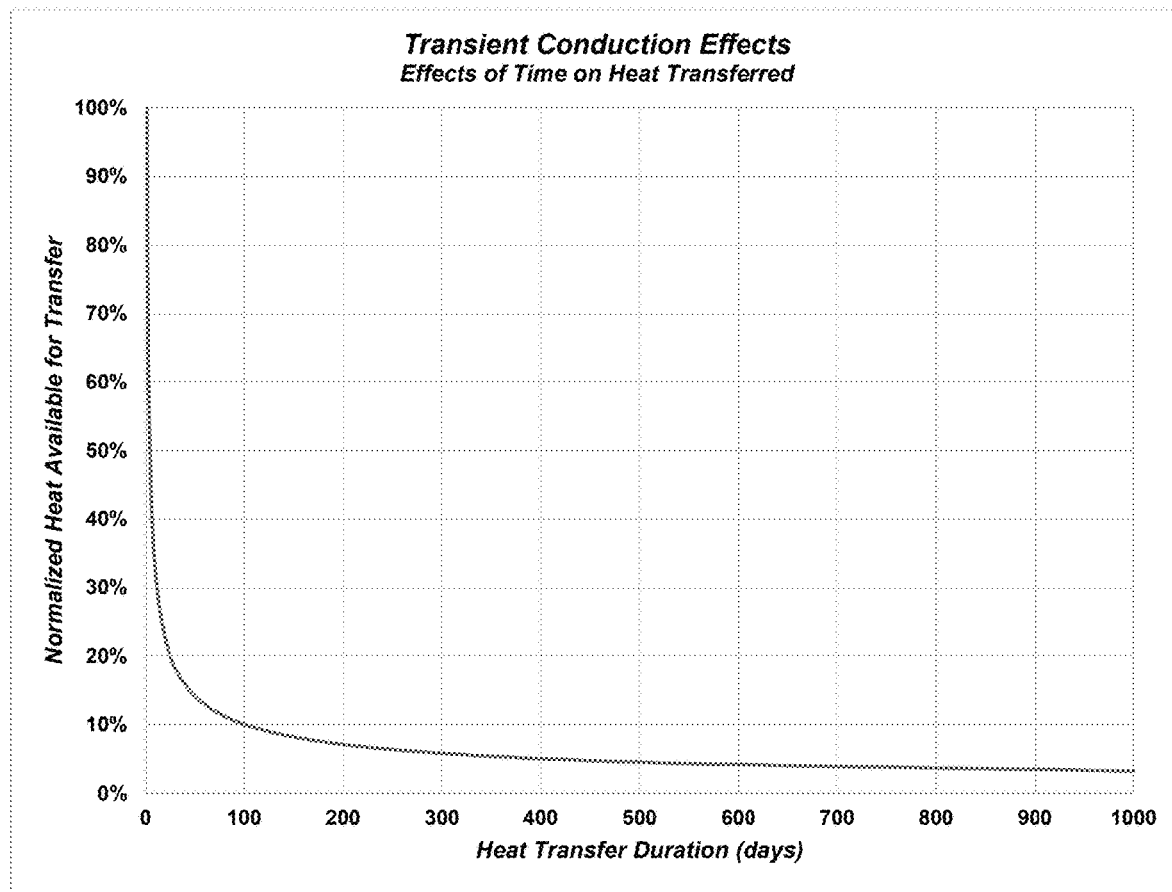
Figure 2:
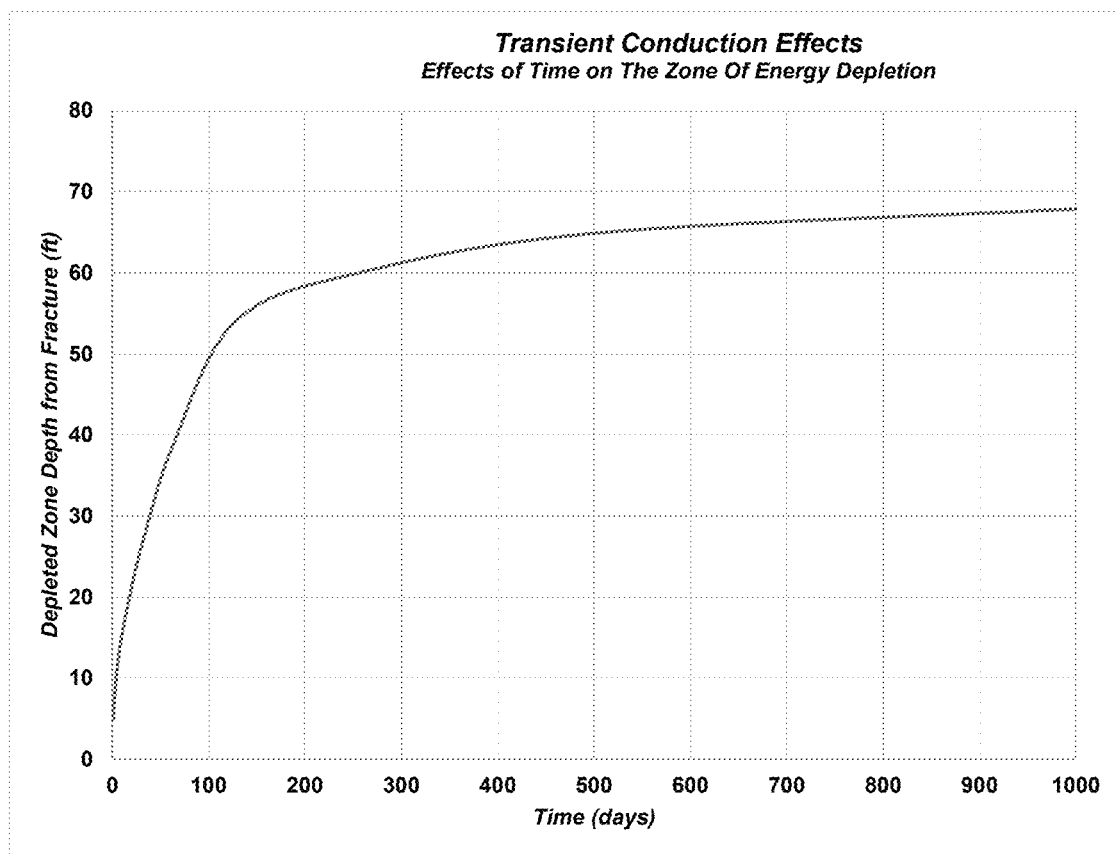
FIG. 2 is a chart showing transient conduction effects of time on the zone of energy depletion.

The use of subterranean rock for collecting and storing heat is alluring. When considering the need for electrical energy to be transmitted to end-customers as power to drive various workloads, the amount used in the USA is roughly 40 TW-hr (~136.5 trillion BTU) each day. And yet, in a block of rock with dimensions of 1 mile×1 mile×300 ft, approximately that amount of energy can be stored when depleting the rock's temperature by 400 F°. The use of naturally-heated rock, then, where the rock can easily contain heat at 1000° F., would seem to be a useful resource for recovering said naturally-occurring heat. There is another method of delivering and recovering heat from rock by heating a working fluid and circulating said fluid through porous and permeable rock. The heating of the working fluid can be performed though the use of concentrating solar irradiance directly or indirectly into the working fluid. This concentration of solar irradiance can be by various means; e.g., parabolic trough reflectors and various Fresnel-style reflecting elements, or even through the direct conversion of wind or sunlight into electric power and subsequently dissipating that power as heat into a working fluid. The great difference between harvesting existing heat from naturally-occurring hot rock and synthesizing the necessary temperature deals with a combination of cost and process durability. Naturally-occurring hot rock will, inevitably, be depleted, while synthetic rock heating and heat recovery is as perpetual as the existence of sunlight. Other problems exist in using naturally-occurring rock heat as already discussed. Through the storage into and recovery of heat from rock, which exists extensively throughout the planet, months-worth of energy can be harvested and reused as needed, filling in power generating needs where other renewable sources become ineffective; e.g., when the wind does not blow or when sunshine is not present.

In order to better understand the present invention, it is useful to state some geologic principles. The ancient and ongoing deposit of sands and carbonates around the world is much discussed in literature. The erosion of tectonically created surfaces results in the deposition, in an aqueous environment, of soil particles which accumulate in layers. These particles interact with one another to create void spaces between themselves (known as porosity). These void spaces can also allow liquids and gases to migrate, the resistance to flow being determined by the size and connectedness of the spaces (known as permeability). Over time, these deposits are further covered and recede deeper into the depths of the earth. Through tectonic movement these deposits further are folded and/or fractured in such a manner that, hydrostatically, the cited interstitial fluids are trapped and may practically only flow within the trapped region, creating a fluid reservoir. These reservoirs can be vertically and laterally extensive, occupying cubic miles of earth. This discussion regarding porosity, permeability and trapping is the foundation of the search, discovery and production of useful waters, crude oil and natural gas and all of the associated business activities. These porous permeable traps are widespread throughout the earth, as demonstrated by the widespread production of crude oil and natural gas.

Within the earth's elastic limits, fluids may be introduced into naturally-occurring reservoirs for various purposes. Adding fluids increases a reservoir's pressure and causes the reservoir to expand (i.e., in a balloon-like manner), while removal of fluids causes a reservoir's pressure to decrease and the reservoir to shrink. Similarly, adding fluids which are hotter than the reservoir causes the reservoir's temperature to rise. Adding fluids cooler than the reservoir causes the reservoir's temperature to fall. The thermal energy which is added to a reservoir is absorbed by both the interstitial fluids and the reservoir rock. This energy transfer is mostly to the rock, itself, since the interstitial fluids occupy a small percentage of the total volume and mass of the system and the rock/fluid system must be in thermal equilibrium. Thermal energy transferred into the reservoir migrates throughout the reservoir and is controlled by the manner in which the injected fluids migrate throughout the reservoir and by the thermodynamic heat transfer laws (radiation, convection and conduction). Analytic solutions have proven that all fluid flow through reservoirs is laminar in nature, practically eliminating radiation and convection heat transfer, thus defining heat transfer in reservoirs as being essentially by conduction.

Heat Storage/Retrieval in Naturally-Occurring Reservoirs. Computations determine that injection of hot fluids into reservoirs will cause the reservoir's temperature to rise, the heat being transferred to the reservoir rock grain matrix and fluids as the fluids migrate through the reservoir. This rise in reservoir temperature demonstrates a means of storing industrially useful amounts of heat into very large natural masses. This increased temperature, which creates expansive rock strain, also causes a substantial increase in rock stresses. These strains and subsequent porosity enhancements occur at orthogonal axes to previous injectant pathways, as caused by earlier injectant-induced rock strains, and through multiple thermal injection cycles, ubiquitously create enhanced porosity and associated enhanced permeability. Injection of cool fluids into a heated reservoir will result in those fluids being heated by the hot reservoir rock, and the rock to cool-thereby cycling the strain/stress tensor imposed on the rock, creating, through a cyclic nature, the formation of enhanced permeability. The removal of fluids from the reservoir, which will be heated by the intimate contact between the injected fluids and hot reservoir rock, demonstrates a means for recovering stored heat. These energy storage and retrieval processes can be performed at different times or simultaneously, while remaining within the nominal elastic limits of the reservoir rock. It is also by this cyclic introduction and removal of cold and hot fluids, respectively, that the reservoir becomes increasingly receptive to fluid introduction and removal, thereby enhancing the energy introduction and retrieval capacity of the system.

Heating Injectants for Reservoir Management. It is conventional in petroleum production operations to inject fluids into oil-bearing reservoirs. These fluids help to increase the amount of oil that can be profitably recovered. Further recovery enhancements have been implemented by heating the injected fluids. In the case of water injectant, the water may be heated to very high temperatures in a liquid state, or even beyond, to cause the water injectant to boil, thereby increasing a reservoir's temperature. In virtually all cases the heating of waters occurs at the surface in fuel-fired heaters, and in all cases, the purpose of injecting heated injectants is to recover more oil or gas with greater profit.

Solar Heating of Injectants. There is a long history of technologies being developed to collect sunlight onto devices containing fluids to be heated. Through the use of concentrating reflectors (parabolic mirrors, heliodynamic reflectors, etc.) sunlight may be concentrated so as to heat a fluid hundreds of degrees above its original temperature.

Renewable Energy Surplus. The use of sunlight and wind to produce socially-useful amounts of renewable energy has become an increasingly larger share of total energy usage. Overproduction of electricity from renewable energy sources, that is, the production of electricity which exceeds electricity demanded by power-grid customers, is problematic, since this electricity cannot be effectively stored for future use (e.g., the average daily use of electricity used in the USA is about 40,000 GW-hr), and which causes these sources to be dispatched or uneconomically diverted whenever overproduction of electricity occurs. Through the use of electric heating systems (e.g., resistance heating, microwave heating, electric arc-discharge heating, heat pump heating, etc.), surplus energy can be converted into heat to be stored, thereby allowing full operation of renewable energy systems. As described above, this heat may be injected into reservoirs to be stored and retrieved as needed.

Retrieved Renewable Energy Transformation. Heated fluids may be lifted from heated reservoirs using pumps, or, in the event the reservoir pressure is sufficiently high, those fluids may self-lift to the surface. At the surface the heated fluids may be processed in several manners.

(1) If fluid pressures are sufficiently high, they may be expanded and introduced directly into a turbine (Rankine or Brayton cycle, as best fits the fluids being produced), which would drive an electricity generating machine (e.g., three phase alternating current generator).

(2) Fluid pressures could be reduced while being introduced into a separation vessel, and then the vapors could be introduced into a turbine, as in (1).

(3) The heated fluids could transfer their heat to an intermediate, low-boiling-point heating fluid (e.g., propane), with that fluid being expanded across a turbine, as in (1).

(4) Infrared heat from the produced liquids could be directly transferred to thermoelectric effect devices or infrared photovoltaic cells, thereby producing direct-current electricity.

The efficiency and cost effectiveness of each of the power cycles described above, based on the cycle working fluid characteristics, would determine the preferred applied cycle.

In accordance with the present invention, renewable energy is used to produce electricity which is then stored by heating a suitable fluid, such as water, which is injected into a permeable, porous subterranean reservoir for the purpose of heating the grain matrix rock, thereby storing the heat for further use. The heat can be stored over a short period of time, such as during non-peak production of electricity from the renewable energy, or over a long period of time (e.g., over years or more). When it comes time to recover energy stored in the permeable, porous subterranean reservoir, hot reservoir fluids are recovered from the heated reservoir and their heat is transformed into electric power as demands require. For large naturally-occurring, permeable, porous subterranean reservoirs, e.g., the Kern River Oilfield, localized heating and recovery can result in useful short-term energy storage and recovery, whereas widespread and long-term energy delivery can result in large quantities of useful energy storage which may be withdrawn over longer periods of time.

The present invention can use any known present or future technology to heat water or another liquid, or to inject it into a naturally-occurring, permeable, porous subterranean reservoir, or to produce hot reservoir fluids from the reservoir, or to produce electric power from hot fluids recovered from the heated reservoir. The present invention recognizes that excess renewable energy can be stored and recovered from a geological fluid reservoir as demands require. Once this is recognized, renewable energy can be generated and stored in subterranean reservoirs from which it can later be recovered, and such storage/recovery can be over short periods of time (less than a day) or longer periods of time, including much longer periods of time of years or more.

Once the concept of the present invention is recognized, one skilled in the art will immediately recognize that existing oil fields can be fitted with multiple energy producing sources, whether solar or wind or a combination of the two, and that multiple injection wells can be used for heating the reservoir and recovering heat from the reservoir, and that heat efficiencies can likely be achieved, depending upon the size of the reservoir, by using multiple wells. By using existing wells, the costs associated with drilling wells can be saved. It is also worth noting that the present invention can be utilized wherever there is a suitable permeable, porous subterranean reservoir for storing and retrieving heating fluids and renewable energy can be harnessed.

In order to better understand the present invention, the invention will now be described by reference to certain preferred embodiments which are not meant to be limiting, but to be illustrative, of certain aspects of the present invention.

In all cases, there must be a reservoir receptive to injecting liquid heated by renewable means (e.g., solar heating) into and removing heated liquid from said reservoir. Further, a reservoir, which is described as being comprised of solid, granular matter deposited so that the grain interstices are connected or displaced by tectonic forces (i.e., ubiquitous fractures), which thereby possesses the presence of interstitial or fracture porosity; that property which allows liquid to be stored in the reservoir; and connected interstices or fractures (i.e., primary and secondary permeability) being used for the transmission of liquid through the reservoir. The presence of porosity and permeability is always required for this invention to apply, and is found in all aquifers, or aquifers which have been naturally invaded by migrating fossil hydrocarbons (i.e., oil and gas fields). In all cases, there must also be present at least one well which penetrates and communicates with a reservoir, thereby allowing injection of renewably-heated liquid into the reservoir and recovering said injected liquid from the reservoir. The liquid which is used in the present invention should be an effective solvent for enhancing porosity and permeability of the naturally-occurring, permeable, porous subterranean reservoir, and water at a temperature of 250° F. or greater (up to an upper effective maximum temperature of approximately 700° F.) is an especially preferred effective solvent. In accordance with the present invention, repetitively injecting an effective solvent into the reservoir will create a measurable increase of units of permeability in the reservoir between a pair of wells, at least doubling the amount of permeability, and even increasing the units of permeability (such as the Darcy) up to tenfold or more. The Darcy is a unit of permeability defined using Darcy's law. The Darcy is referenced to a mixture of unit systems. A medium with a permeability of 1 Darcy permits a flow of 1 cm$^3$/s of a fluid with viscosity 1 cP (1 mPa·s) under a pressure gradient of 1 atm/cm acting across an area of 1 cm$^2$. The repetitive injection should also induce an increase in the porosity of the reservoir between the two wells by at least 10% (an increase in porosity can be measured by noting an increase in volume capacity between the two wells).

Various configurations of wells can be envisioned, as has been demonstrated by fossil hydrocarbon recovery practices for more than a century. For the above-described energy storage process, heating of the rock grain matrix and associated present fluids will occur through advective and conductive means as the fluids flow through the permeable rock. Heat will be lost from the heating process preponderantly by transient conductive heat transfer. Recognition of this transient heat transfer loss, either through the well bore or in the reservoir itself shows that said losses decline over time, as the function of time$^{-1/2}$, implying that after 1000 hours of injection heat losses drop by ~97%, and that after 1000 days of injection heat losses from the injection process are vanishingly small. In all cases, the repetitive injection and production of heated and cooler liquid (water) will result in the reservoir rock being modified through thermally induced strain and chemical reorganization (e.g., reformation of various formation hydrates), and water-based-dissolution chemical modification, resulting in an enhanced ability to further inject, store and produce. In all cases, sufficient heat must be stored in the formation's rock/fluid matrix to make the recovered fluid's temperature useful enough for commercial applications, including domestic heating, industrial process heating and electric power generation. This injection, storage and production process can be limited by the reservoir's structural competence, or elastic limit, (i.e., to ensure the formation may contain the injected fluid at desired pressures).

A simple means for injecting, storing and producing heat is to create an injection/production well pair. In this embodiment the heated fluids are injected at the injection well and then travel across the reservoir over an extended distance to the producing well, thereby heating the formation near both wellbores and the reservoir's volume between the well bores. Flow between the injection well and the producing well will likely travel in radial streamline flow thereby heating the reservoir rock and fluids in the streamline region by advection, but also, the reservoir will be conductively heated normal to the streamline, thereby storing additional heat in the reservoir. The flow of these heated waters will, as previously described, modify the reservoir rock to enhance the reservoir's flow and storage properties. Simultaneous injection and production in this embodiment is typically not a requirement since the bulk modulus of the rock will allow elastic formation dilation, further increasing the heat storage effect and pressurizing the formation to enhance its ability to deliver heated fluids to the producing well at a later time. Nonetheless, simultaneous injection and production may occur in this and other embodiments. An injector/producer pair, distanced by 50 meters, will allow the storage and retrieval of useful heat that is storable or recoverable over months durations. It is also important to understand that these cited wells (injector, producer) do not consign their service solely to their described function (i.e., an injector may be converted to producing service, and vice versa, based on the utility of the available renewable energy, either collected or recovered). Also, it is especially preferred that the spacing of an injector/producer pair be greater than approximately 50 meters, with an especially preferred pairing distance being approximately 71 meters; the reason why such spacing is important is because capital constraints and considerations associated with drilling costs become important in optimizing such spacing.

Another preferred embodiment of this invention is to populate a large portion of, or an entire reservoir (aquifer or oil field) with injection wells and producing wells. The injection and production process would be as described in the injector/producer pair but would store heat on the scale of years-worth of usable heat over the reservoir's extent. It is this embodiment which would seem to be most likely used to produce electric power. This preferred embodiment, for the purposes of power manufacture using renewable heat injection, storage and production, would call for heating a reservoir to temperatures of approximately 500° F. (which could be 10% less), or greater than 500° F., and would take several years of heat delivery to achieve such a temperature. Achieving reservoir temperatures of approximately 500° F., in this preferred embodiment, is economically essential to achieving efficient recovery of thermal energy from the reservoir. (Because of issues dealing with reservoir size and characteristics, as well as production issues related to a given reservoir and solar and power plants associated with such a reservoir, it might be economically feasible to begin to produce electric power at lower temperatures, at less than 450° F., but a higher operating temperature, for long term operation, is especially preferred.) During the early-time heat storage process, where an oilfield is used for these purposes, the heated waters, while modifying the reservoir rock to enhance its storage and transmissibility as previously described, will also modify the relationship between the rock, the water and the in-place hydrocarbons, if present, to aggressively liberate stranded hydrocarbons through wettability transformation and hydrocarbon evaporation. The heated water could be simultaneously used for domestic heating, industrial heating, power manufacture or even for direct reinjection for energy retention, based on the demands of the associated processes and their economic utility.

A heat injection example, typical of oilfield heating practices, has demonstrated that energy stored in a comparatively small 5000 ft×5000 ft×300 ft oilfield reservoir heated to 500° F. exceeds 37000 GWh of stored heat, which is comparable to the total daily electric power heat equivalent used in the USA as of this writing.

A reservoir starts out with an initial receptivity which is then altered over time due to the repetitive cyclic nature of injecting hot fluids to first store energy into the subsurface, then switching to injecting colder fluids, heating said fluid, retrieve the stored energy, circulated back to the surface converting the retrieved thermal energy into mechanical energy via surface facilities, spinning a turbine to produce electricity. Hot/Cold fluid thermal shock treatments can be employed for the purposes of receptivity enhancement independent of energy storage and retrieval. Receptivity is enhanced incrementally and accumulates over time with each cycle. Receptivity changes over time are revealed by measurements that are taken as standard practice in oil fields, such as (but not limited to) step rate injection tests, flow rates, volumes, pressures during injection and production operations. Measured data from each individual well is fed into a database to form a time series analysis where changes in said measurements can be charted and analyzed. Geophysical surveys such as (but not limited to) seismic, fiberoptic, and satellite surveys can also be performed in a time series fashion to form 4D pattern analysis to infer receptivity changes over time. As observed in water flooding operations, streamlines or preferential flow paths are formed between injector and producer. In some cases, these streamline connections cannot be determined a priori due to (but not limited to) reservoir permeability heterogeneity, viscous forces, gravity forces, in situ stress field and far field stresses induced by offset well states on either injection or production states. Take the scenario of a 5 spot pattern where an injector well is surrounded by 4 producer wells. Over time a streamline will form where the receptivity is greater between the injector and one of the four producers. Each cycle reinforces streamline formation and the associated receptivity changes concentrate in and around the streamline. Streamline formation can be reinforced or diverted via well pattern reconfigurations, altering an injector into a producer reconfiguration via reservoir management practices informed by analysis of the above mentioned database and geophysical surveys. As the receptivity improves, the efficiency of the total system (surface facilities to reservoir) improves providing more storage and power retrieval per unit volume over time.

Accordingly, the present invention, as already described, provides a process for recovering and storing a renewable energy. This process begins with heating a liquid (which can be water) to create a heated liquid at a first temperature (which can be at least 250° F., or higher) through use of a renewable energy (either a solar derived energy and/or a wind derived energy). Next, the heated liquid is repetitively injected in a naturally-occurring, permeable, porous subterranean reservoir configured with constituent grain matrix rock at an initial reservoir temperature which is less than the first temperature so as to transfer heat from the heated liquid to said naturally-occurring, permeable, porous subterranean reservoir. The heated liquid is said to be repetitively injected, instead of continuously injected, due to the intermittent nature of production of the renewable energy. Next, a heat recovery liquid (such as water) at a second temperature is injected into the naturally-occurring, permeable, porous subterranean reservoir and a reservoir recovery liquid is produced from the naturally-occurring, permeable, porous subterranean reservoir at a third temperature which is less than the first temperature but greater than the second temperature, said second temperature being less than the first temperature. The foregoing processes are repeated within nominal elastic limits of the naturally-occurring, permeable, porous subterranean reservoir so as to create enhanced porosity and enhanced permeability for the naturally-occurring, permeable, porous subterranean reservoir which is measurable by an increase of units of porosity between a first well and a second well that are separated by a preselected distance. Once this has occurred, a hot reservoir liquid can be produced from the naturally-occurring, permeable, porous subterranean reservoir at a fourth temperature which is greater than the initial reservoir temperature, and then the heat from this produced hot reservoir liquid can be used to generate electrical energy. Central to this process is injection of the heated liquid and production of the hot reservoir liquid are controlled so as to store and recover renewable energy. Also, the heated liquid is heated to a temperature at which the heated liquid will be an effective solvent for enhancing porosity and permeability of the naturally-occurring, permeable, porous subterranean reservoir, the preselected distance is greater than approximately 50 meters, and the measurable increase of units of permeability is at least twice an initial unit of permeability of the preselected distance between the first and second wells. Over time, the repetitive injection of the heated liquid into the naturally-occurring, permeable, porous subterranean reservoir causes an increase in porosity of the reservoir between the first and the second wells of at least 10%.

Figure 3A:
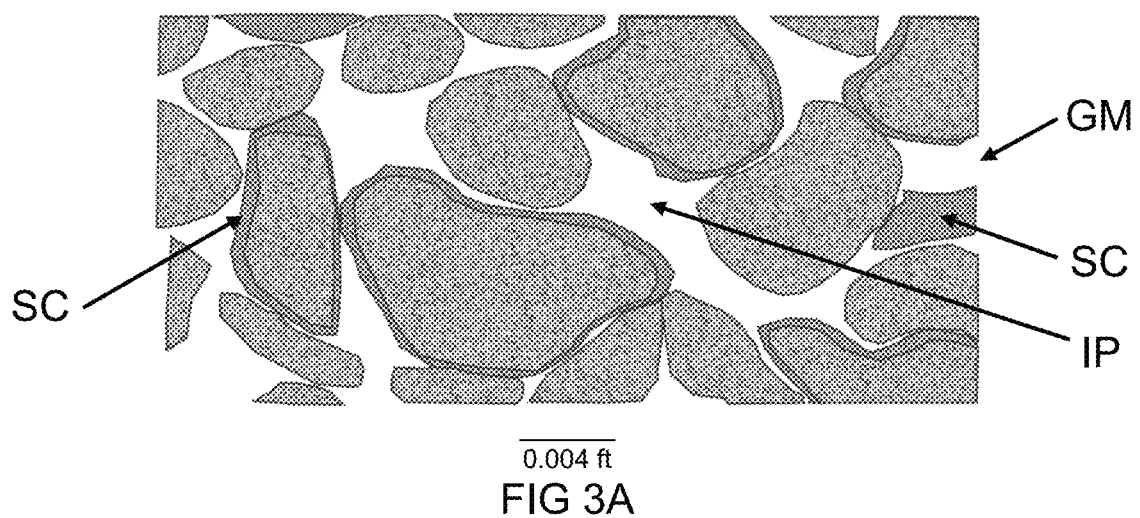
Figure 3B:
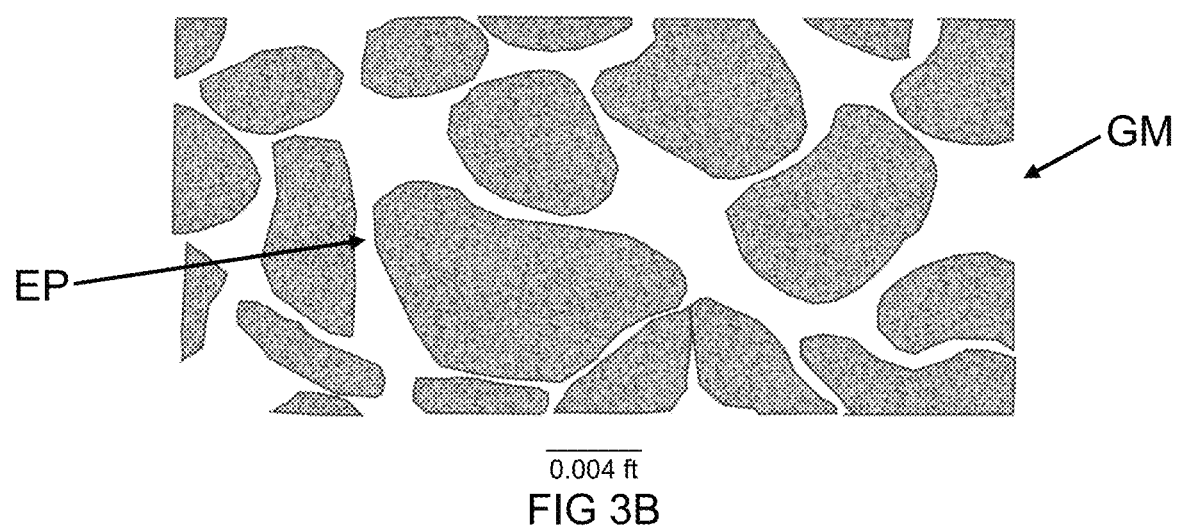
FIG. 3B is an illustration of the same porous rock after application of heat and fluids where soluble contaminants have been removed and there has been pore throat enhancement.

Increased porosity and permeability in accordance with the present invention is illustrated in FIGS. 3A and 3B. In FIG. 3A, a grain matrix GM has soluble contaminants SC which limits interstitial porosity IP before application of heat and fluids. After application of heat and fluids, as is illustrated in FIG. 3B, grain matrix GM now has enhanced interstitial porosity EP due to removal of soluble contaminants.

The present invention will now be described in even greater detail by reference to a system useful in the storage and production of commercially useful amounts of energy.

In contrast to SGE methods used to collect energy from HDR, this invention conceives of the use of porous, permeable rock for the purposes of absorbing and desorbing heat. Porous rock is described as being grains (G) of solid material, as in alluvium, where the grains touch one another leaving interstitial space between the grains. This configuration is described in the images set forth in FIGS. 3A and 3B.

As illustrated in FIGS. 3A and 3B, the interstices of the grain matrix allow fluids to flow through the matrix. Much as described above, heat is transferred from the heated fluid into the grains limited by conduction. However, since the grain size is roughly 0.004 ft, the SVR for such a system is roughly 1/0.004, or 250, which is 17,500 times greater than heat transfer ability of fractured HDR. As such, the ability to transfer heat into or out of a grain matrix is essentially limited by the ability to transport fluids through the matrix, and not by the limitations of heat transfer.

Therefore, due to the simultaneous effects of volumetric depletion depth, fluid flashing, and heat transfer rate limitations, the application of HDR SGE, as described above, teaches nothing regarding the invention described herein.

Figure 4:
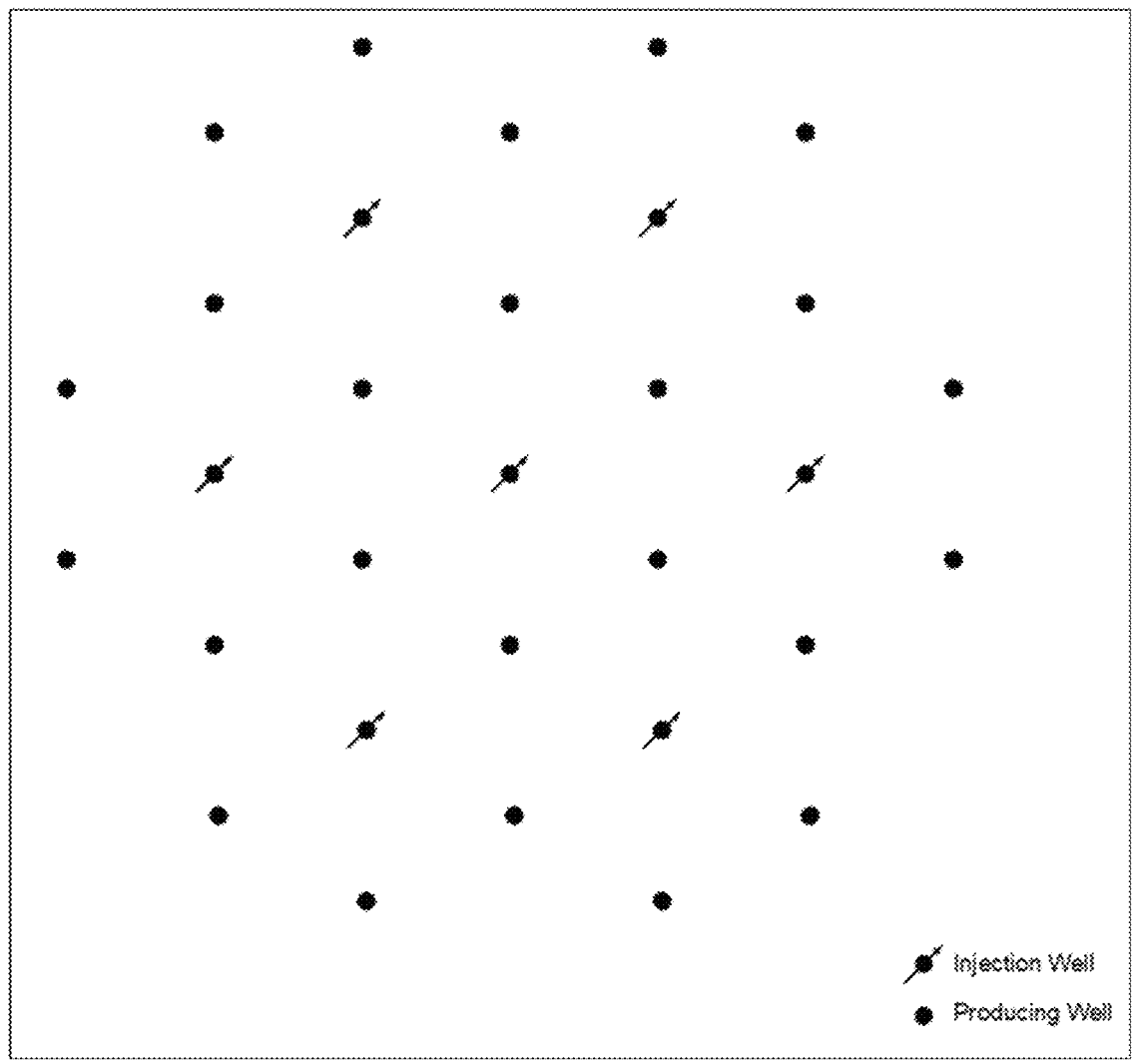
FIG. 4 is an illustration of one exemplary configuration of an array of injection and producing wells useful in accordance with the present invention.

The present invention calls for the heating of fluids to be injected by renewable means; direct solar heating of a working fluid which would heat the injected fluids, or by using surplus renewable power to heat a working fluid, which would then heat the injected fluids (i.e., injectant). In this invention, there must be a continuous body of sand grains which has properties which confine fluids, thereby preventing fluid migration and loss—this configuration is known as a reservoir. The renewable heat will be injected into dedicated injection wells, to travel through and be confined by the porous and permeable reservoir natural boundary. As the injectant travels through the reservoir it gives up its heat to the grains. This heat transfer process is limited by the amount of injectant flowing, and by the reservoir's temperature; the higher the reservoir temperature, the lower the heat transfer rate; the higher the injectant flow rate the higher the heat transfer rate. Therefore, a means of ensuring very high injectant rates is essential to economically heat a reservoir. Also, the goal of creating a very high reservoir temperature will support heat transfer, and hence support the storage of heat for further reuse, for a longer period. An exemplary configuration of injection and producing wells is shown in FIG. 4 which efficiently supports high injection and production rates.

Flow rates are limited by the torturous nature of the grain structure and by the stresses which are exerted onto the matrix to support flow. The use of injection well/producing well configurations is essential to this embodiment of the present invention in that the relationship between the two well types support the widespread heating of the grain matrix, unlike the heating or heat extraction associated with SGE HDR, because the entire grain matrix will participate in the heating/heat extraction process if the flow management process ensures what is known as elastic flow. Pressure drop from an elastic flow process is shown in FIG. 5.

Figure 5:
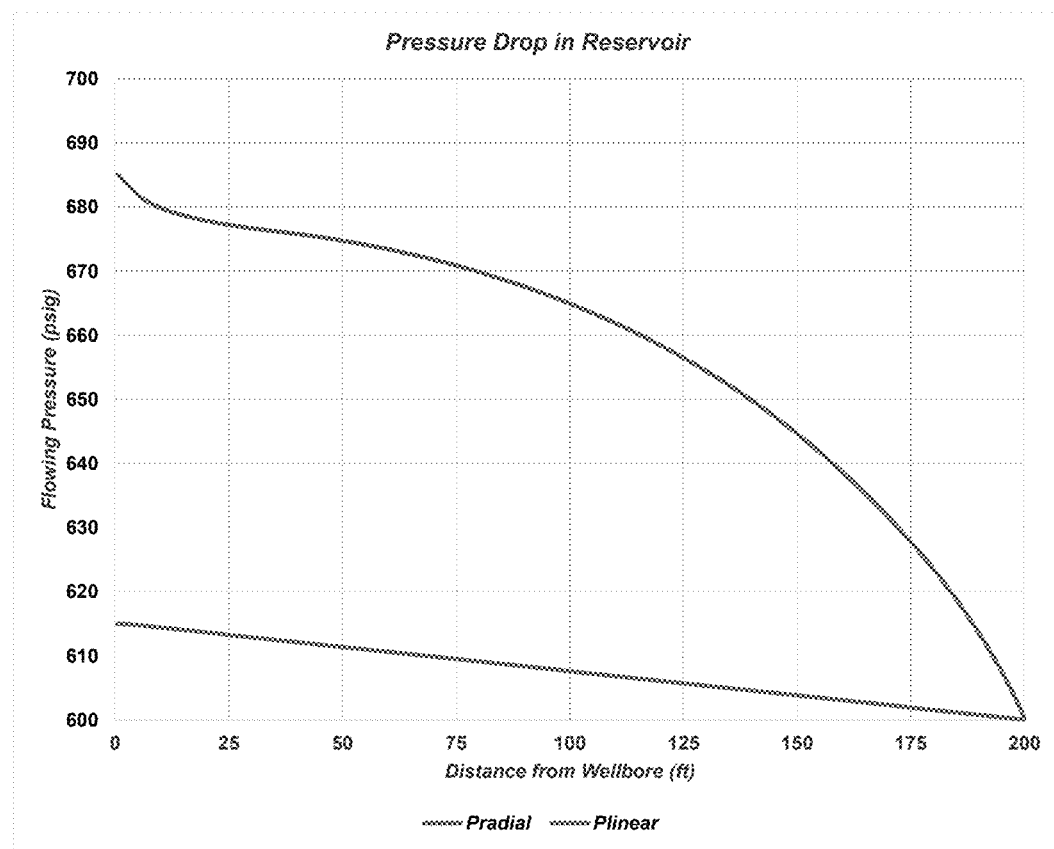
FIG. 5 is a chart which illustrates pressure drop from an elastic flow process in a reservoir according to the present invention.

As can be seen in FIG. 5, the pressure drop for radial elastic flow, pressure-induced reservoir stress is continuously curved, which implies the flowing fluid is substantially contacting the entire reservoir. In the event stresses on the grain matrix exceed its elastic limits, which would create fractures in the rock, the pressure drop curve between injection well and producing well will decrease and become linear. And with such a linear flow-induced fractured circumstance the heat transfer process will function as SGE HDR, grossly limiting heat transfer in both storage and recovery, as described above (by ~17,500 times).

In summary, relative to introducing and recovering heat into a reservoir, this embodiment of the present invention requires a porous and permeable reservoir be present, and that an array of injection and producing wells be employed for this heat storage and recovery process using a renewable energy source for the purposes of delivering heat into the reservoir for eventual recovery in the manufacture of electric power. Injectant delivery rates must be managed to keep the injection process within the reservoir's elastic strength so as to ensure maximum grain matrix volumetric energy storage.

Utility scale electrical energy production needs to process 100's of thousand barrels of fluid per day to produce hundreds of MW of power. About 4000 barrels of heated fluid is needed per MW-hr of electric power at the current temperature limitations of surface facilities. Heated fluids from the subsurface, whether accessing NOGE, SGE HDR, or a heated reservoir from renewables, the wellbores become a limiting factor when building a system and wells at fluid flow rates for Utility-scale energy production.

Figure 8:
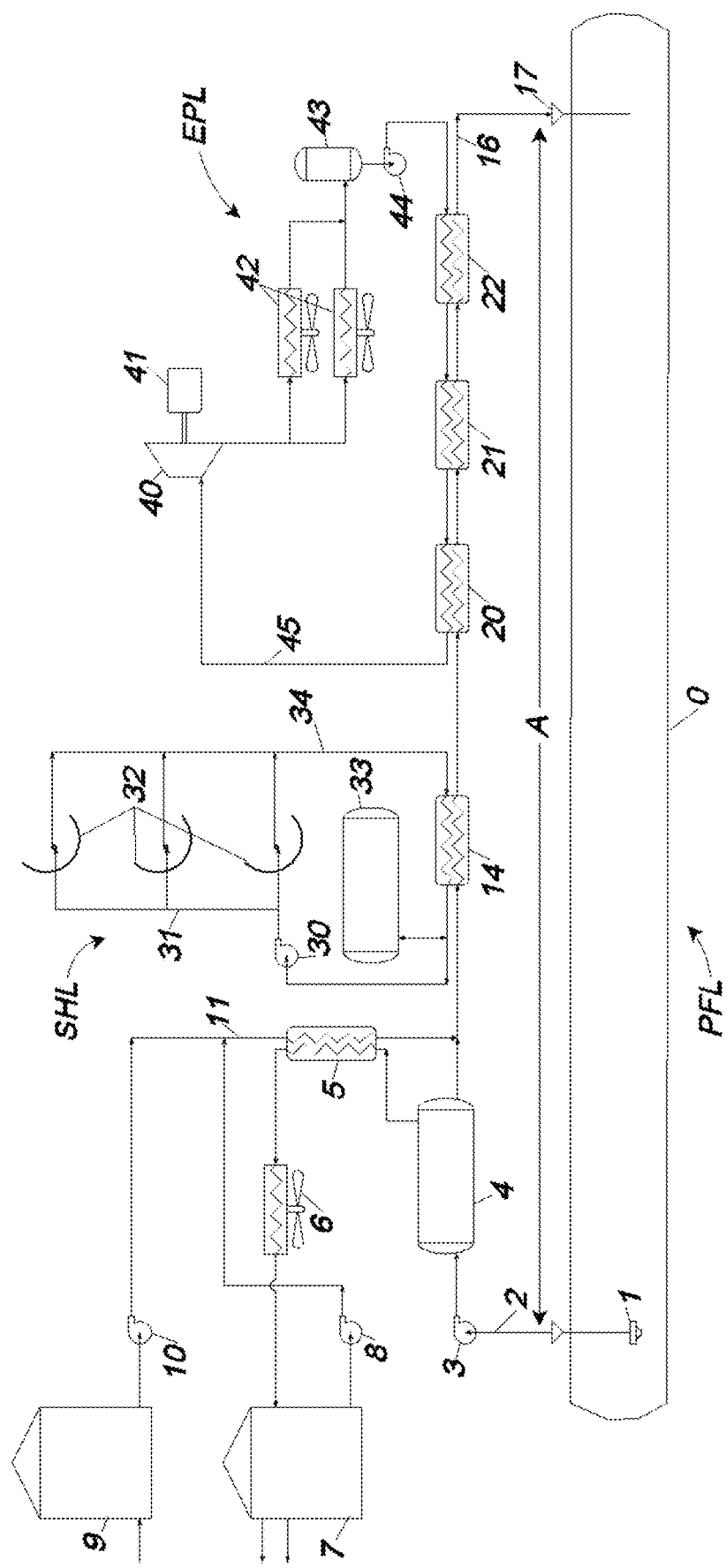
FIG. 8 is a process flow diagram which illustrates one preferred embodiment of the present invention.
Figure 9:
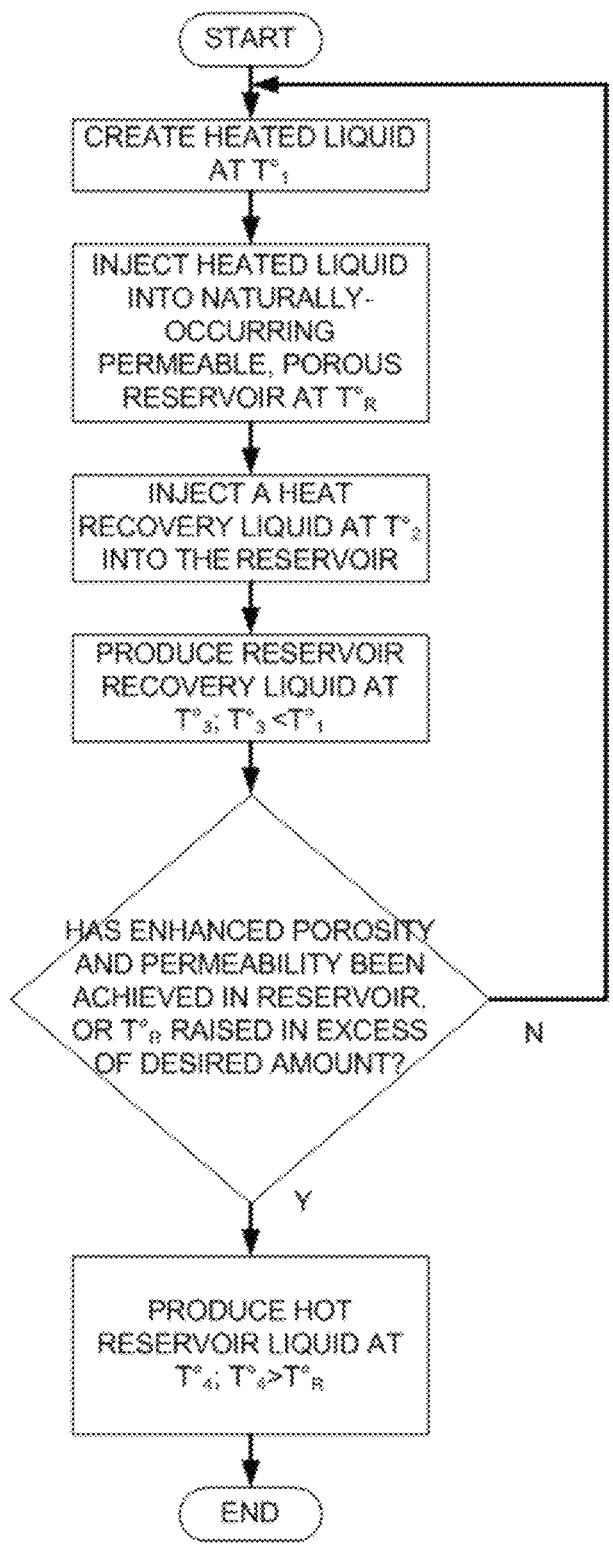
FIG. 9 is a flow chart which illustrates steps of the present invention.

FIG. 8 illustrates the process of a naturally-occurring, porous and permeable reservoir-based SGE process in accordance with one preferred embodiment of the present invention. Included as a requirement of this illustrative process and associated equipment are:

A reservoir, equipped with producing wells and injecting wells, A.

A reservoir fluids circulation system, PFL, to store heat into the reservoir and recover heat from the reservoir; the circulation rate for the injected fluids being matched to the rate of lifted fluids to ensure that neither fluid invasion into the reservoir nor fluid leakage out of the reservoir occurs, A concentrating solar energy collection system, SHL, with a heat transfer fluid system to transfer collected solar heat into the reservoir fluids circulating system, A Rankine or Brayton cycle turbine for producing electric power, with a Rankine or Brayton cycle working fluid circulating system, heat transfer elements to absorb heat from circulating reservoir fluids, and to reject that energy not absorbed in the production of electric power, EPL.

Other separation and recuperation systems associated with oil production, where oil reservoirs are used for this process.

In operation, the reservoir fluid circulation system must be operated in elastic flow mode so as to support the transfer of heat into the reservoir and collect heat from the reservoir. This method is managed using a comprehensive pressure and flow monitoring and control system.

Produced Fluid Circulation Loop

The Produced Fluid Circulating Loop accesses the reservoir and delivers heat to the reservoir and recovers heat from the reservoir. The produced fluids will be heated by the Solar Heating Loop and will deliver heat to the Power Generation Loop. As the produced fluids are heated by the Solar Heating Loop, they are injected into the Injection Wells, where the produced fluids surrender their heat to the naturally occurring porous and permeable rock. Heat is transferred following the thermodynamic and heat transfer laws, where:

$$\text{Heat Transfer Rate} = \rho_{in} v_{in} c p_{in} T_{in} - \rho_{out} v_{out} c p_{out} T_{out}$$

Where:
Heat Transfer Rate has units of power—BTU/sec
ρ is temperature-varying fluid density of the circulating fluid—lb/ft$^3$
v is fluid flow rate of the circulating fluid—ft$^3$/sec
cp is the temperature-varying specific heat of the circulating fluid—BTU/lb-F°
T is the temperature of the circulating fluid—° F.
$_{in}$ and $_{out}$ are used to reference where the fluid is relative to the heat transfer process; in: injected, out: produced As can be seen, the heating process is dependent on the volume rate of fluids injected and produced, the produced fluid's temperature-dependent characteristics, and the temperature change that occurs through the injection process. In the early time of injection, the produced fluid temperature will be roughly that of the native temperature of the reservoir. Calculations show that it will take months to years of heat injection to raise the reservoir temperature to a commercially-useful level, as shown by the chart set forth in FIG. 6.

Figure 6:
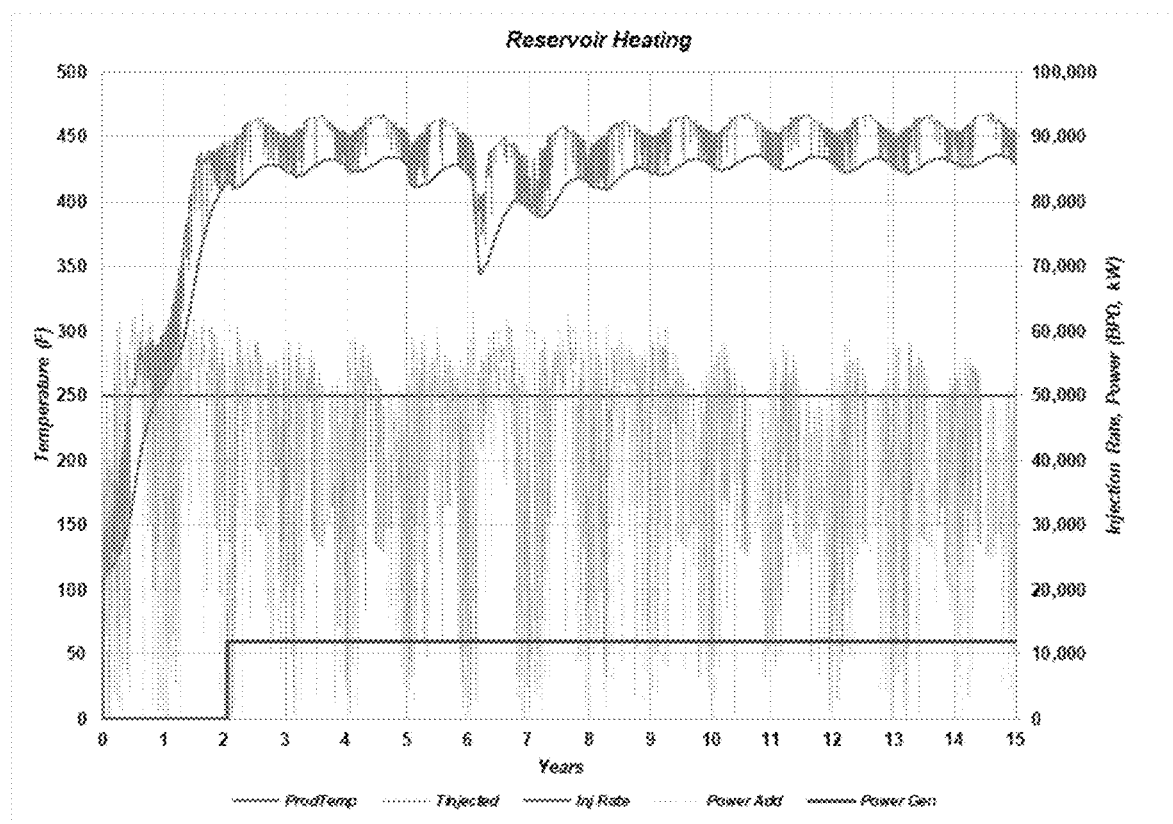
FIG. 6 is a chart which illustrates reservoir heating over time.

FIG. 6 shows how historically-correct solar irradiance (erratic green line) is used to heat the Produced Fluid (erratic orange line) at a constant circulation rate (red line), and how that heating results in the reservoir temperature being raised (blue line), and in the case above, will take about two years to allow support of power generation (purple line). As the reservoir's temperature rises it becomes less receptive to it heating, because heat transfer, as shown in the previous equation, is proportional to the temperature difference present. Thus, to increase the heat transfer rate, with increased reservoir temperature, the circulation rate, v, must be increased. Based on measured temperature differences, the cost-balancing control process will be used, therefore, to maximize heat transfer where limiting temperature differences are present. More discussions about the above chart follows when addressing the other circulation loops. Since heat is collected only when sunlight is present heat will only be delivered to the reservoir, when using a solar heat source, when sunlight is present-during daytime hours. Thus, the addition of heat to the reservoir is periodic and episodic (i.e., when there is daylight and when there are no clouds interfering with the gathering of sunlight). In periods when sunlight is inadequate to transfer heat the Produced Fluid Circulation Loop need not be operated at rates shown, but only to the extent of keeping the injecting and producing wells operable in the presence of suspended solids and scaling materials, thereby minimizing power required to circulate those fluids.

In the present invention, liquid waters will be intentionally kept under pressure so as to prevent flashing, thereby better managing the system, and its heat and mass extraction capacities.

As the temperature of the reservoir and the circulating fluids rise, those fluids being mostly water, pressure must be exerted on the fluids, by adding flow resistances, to ensure they will not change phase to create water vapor (i.e., flashing). This pressure is exerted through the measurement and control of the producing well pumps, not allowing fluids to be lifted by the well pumps until the sensed pressure exceeds the known vapor pressure of the circulating fluids, as known by measurement of the circulating fluids' temperature at each wellhead. This pressure/temperature relationship is well known to those skilled in the art, and said data are published by USA and international standards bodies for just such use (e.g., *ASME International Steam Tables for Industrial Use*, W. T Parry, ISBN 0791801543, 9780791801543). By maintaining the fluid in the Produced Fluid Circulating Loop in a liquid state dissolved solids (e.g., NaCl, SiO$_2$, CaCO$_3$, etc.) concentrations of these salts will remain in solution and not precipitate in the reservoir, the wellbores or in the surface facilities, thereby maintaining the reliability of the processes.

As has been previously stated, thermal power transfer is dependent on the circulating fluid temperature-dependent properties, the temperature change during energy transfer and the volumetric circulation rate. With the desire to operate the Fluid Circulation Loop in a manner to prevent reservoir fracturing while still desiring to enhance the reservoir's heat transfer ability, it will be desirable to modify the reservoir's ability to elastically support higher and higher volumetric throughput. Through either application of temperature-activated hydroxyl ions into the heated circulating fluid (e.g., NaOH), or in their natural presence, the Produced Fluid Circulating Loop will be used to both displace flow-impeding interstitial hydrocarbon accumulations and modify the reservoir granular structure by dissolving flow-impeding aluminosilicate interstice contamination, thereby increasing interstitial space, and the associated rock permeability and porosity, as described above. These modifications at a heated level are measured and controlled by use of a temperature sensor and by measurement and control of the circulating fluid's pH, as the circulating fluid is being distributed to the injecting wells. A goal of >250 F and pH >7.1 will be effective in initiating an increase to the reservoir's circulating receptivity, described as its permeability with units of Darcys and porosity with units of percent interstitial space in a unit of total rock volume. This elevated temperature and pH will allow reservoir permeability to measurably increase over time by at least double and will be demonstrated by a reduction in the differential injection pressure as described in the "Pressure Drop in Reservoir" chart 5., above. This method of modifying the reservoir's permeability and increasing the reservoir's porosity is a key component of this invention to improve a naturally-occurring porous and permeable reservoir's capacity to absorb and desorb heat to produce electric power.

The Produced Fluid Circulation Loop process is described in FIG. 8. This loop starts in the reservoir (0). Fluids are controlled so as to ensure that the fluids in the reservoir will not boil. This is accomplished by managing the pressure and temperature of the fluid in the reservoir. For example, if reservoir waters are heated to a temperature of 480° F., those waters will boil at ~565 psia. Therefore, in this instance, maintaining the reservoir's pressure in excess of 565 psia will be required to ensure fluid boiling does not occur. There will be a pump in each producing well (1), as described in FIG. 8, showing the relationship and array of producing wells and injecting wells. Each well's pump will lift a required amount of produced fluid to the surface. The determination of this required amount will be discussed later. Once the produced fluids reach the surface they will be collected into a production gathering piping system (2) and delivered to a booster pump (3) to ensure fluid pressure is maintained to exceed the minimum pressure to prevent boiling. This booster pump will provide all the necessary pressure energy to move the produced fluids through the remainder of the Produced Fluid Circulation Loop. The first component through which the produced fluids pass will, optionally, be for the purposes of separating contaminants from the produced fluids, as in the example where the reservoir, through which the produced fluids flow, contains hydrocarbon contaminants. These contaminants will interfere with subsequent heat transfer process and therefore must be removed from the produced fluid stream. This separation process and how it relates to the Produced Fluid Circulation Loop is discussed later, in its own section of the detailed description of the present invention. Once the contaminants are removed from the produced fluid stream the remaining heated waters are passed into the solar heating process, where the Produced Fluid Circulation Loop interfaces with the Solar Heating Loop heat exchanger (14). This interface results in the circulating produced waters to be heated for further heating of the reservoir. Subsequent to the interface with the Solar Heating Loop heat exchanger the produced fluid waters interface with the Power Production Loop heat exchangers: Superheater (20), Evaporator (21) and Recuperator (22), so as to release heat to the Power Production Loop Rankine or Brayton Cycle working fluid. Upon exit from the interface with the Power Production Loop the produced waters are then delivered to the injection distribution piping system portion of the Produced Fluid Circulation Loop (16), where said waters are delivered in a controlled fashion to the injection wells (17) to function as either delivering heat into the reservoir (0) or to be heated by the stored energy in the reservoir for further process uses.

Solar Heating Circulation Loop

Figure 7:
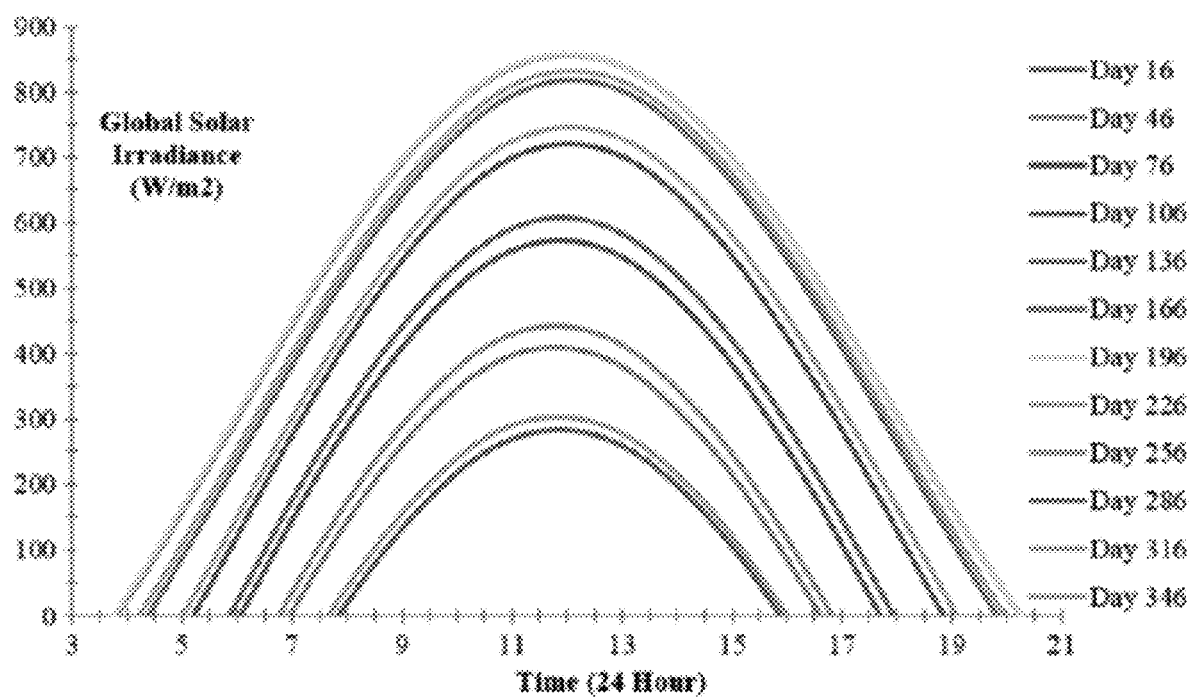
FIG. 7 is a chart which illustrates global solar irradiance versus a 24 hour time period for different days of a calendar year.

In one embodiment of this invention, heating of the produced fluid will occur using concentrated solar heat transfer. In its purest form, the amount of solar power which can be used to transfer heat is described by the chart of FIG. 7. As can be seen, the amount of irradiance is defined by the time of the year. However, the absolute amount of irradiance is also dependent on the latitude where the sunlight is being collected, and more importantly, on the number of cloud-obscuring episodes which will prevent sunlight from being concentrated. As such, any solar heat collecting system must be configured to accommodate a widely varying heat recovery process. As previously described, heat transfer is governed by the following equation:

Heat Transfer Rate=$\rho_{in}v_{in}cp_{in}T_{in}-\rho_{out}v_{out}cp_{out}T_{out}$ In the case of heat transfer from a solar heat supply to the circulating produced fluid, heat transferred will be dependent on the available amount of solar heat gathered, the limitations of the circulating solar heat transfer fluid and the circulation rate and mirrored by the limits on the produced fluid circulation maximum operating temperature and circulating rate.

The control process used for this purpose will balance these rate and temperature limits to achieve maximum collection of available heat to optimize the economic value of the Solar Heating Collection Loop. This optimization will favor higher circulating rates during high irradiance periods while favoring temperature differences during low irradiance and early project periods, thereby managing the previously listed fluid characteristic and rate limits. In so doing, the Solar Heating Circulating Loop, governed by these rules, will command the Produced Fluid Circulating Loop to conform itself to the Solar Heating Circulating Loops requirements, with higher and lower produced fluid rates for best economic and safe system effects.

The Solar Heating Circulation Loop consists of the heating fluid being pumped (30) to move a heat transfer fluid through the solar heating process, where the fluid is distributed through a piping network (31) to solar collectors (32) with control being based on measured heat collection performance. The hot, heat transfer fluid is collected by the solar heated fluid gathering system (34) and delivered to the solar heating loop heat exchanger (14), where the heat of the heat transfer fluid is transferred to the produced fluid. Since the characteristics of heat transfer fluids are temperature dependent and will swell with increasing temperature, an expansion vessel (33) will be provided to manage the increased volume caused as the heat transfer fluid temperature rises. The circulating heat transfer fluid then is returned to the Solar Heat Circulation Loop from the expansion vessel discharge at its minimum temperature.

Electric Power Production Loop

The purpose of the Electric Power Production Loop is to provide electric power when the power grid is in need of electric power; i.e., when the grid is not fully supplied by other power plants. Therefore, one embodiment of this invention produces power during nighttime periods or during periods of consistent cloud cover. So as to ensure power may be produced when power production is called for, the Electric Power Production Loop will be configured to call on the Produced Fluid Circulating Loop to deliver necessary energy to support the described evaporation/expansion/condensation process. The control system for this portion of the invention will respect the previously-stated heat transfer equation:

Heat Transfer Rate=$\rho_{in}v_{in}cp_{in}T_{in}-\rho_{out}v_{out}cp_{out}T_{out}$ In the case where electric power demand requires more heat than can be provided by the Solar Heating Collection Loop, or if the Solar Heating Collection Loop is not collecting heat during night time operation or during episodes of where sunlight is obscured, the heat for power production will come from heat stored in the rock, as it is collected by the Produced Fluid Circulation Loop flowing through the naturally occurring porous and permeable reservoir rock. When both the Solar Heating Collection Loop and the Electric Power Production Loop call on the Produced Fluid Circulation Loop to simultaneously absorb and release heat the control system will respect the above equation heat transfer requirements to minimize concerns for system operability, circulating fluid degradation and power sales contractual commitments. This balance will be managed through use of the heat transfer equations and typical linear algebra optimization processes. (e.g., *Linear Algebra*, Elizabeth W. Meckes and Mark S. Meckes, ISBN 978-1-107-17790-1 1), or by other closed-form determinations.

In one embodiment of this invention, the Electric Power Production Loop will produce power by introducing high pressure superheated vapor, Rankine cycle working fluid

(45) into a Rankine Cycle turbine (40), where it will be expanded across spinning turbine blades creating motive torque. The turbine will thus drive an alternating current electric generator (41), where the power delivered by the turbine will be converted to high voltage alternating current electricity for sale to the electric power grid. The expansion process across the Rankine cycle turbine will be supported by surface condensing heat exchangers, one example of which can be air-cooled heat exchangers (42). By cooling the Rankine cycle working fluid's discharge temperature its pressure is greatly reduced to a vacuum, further improving the efficiency of the power generating cycle. Upon being cooled and thus condensed, the Rankine cycle working fluid, one such embodiment could be purified water, the condensed water is collected in a separation vessel (43) and then pump-pressurized (44) for heating, evaporation and superheating by the Produced Fluid Circulation Loop hot fluid in the recuperation, evaporation and superheating heat exchangers (22, 21 and 20, respectively).

Contaminants Extraction, Fluid Replacement System

As described above in the Produced Fluids Circulation Loop discussion, when this invention is applied to an oilfield reservoir, there is expectation that contaminants will be produced which should be removed from the produced fluid stream; those being oil, gas, reservoir solids and other contaminants. The Produced Fluids Circulation Loop separation vessel (4) will be used to ensure effective, gravitationally-driven, hydrodynamic separation of contaminants from the essentially-uncontaminated produced waters. Because the density of the contaminants is not the same as the circulating water they can be detected using electronic sensors (e.g., dielectric sensing, densitometer sensing, etc.) gathered and discharged to a contaminants recovery process. Because the gravitational and hydrodynamic separation process will not perfectly separate the various components from the produced waters, there will be considerable water collected into the contaminants extraction system. The contaminants will be gathered and separated at circulating temperature and pressure but must be finally processed for disposal/sale at lower temperatures which will preclude boiling at atmospheric processing pressures, i.e., less than 212° F. Also, because the Produced Fluid Circulation Loop, to function properly, is designed to properly operate where the reservoir is fully filled with liquids, any contaminants removed in this process must be replaced with waters. The replacement waters will be typically acquired at room temperatures and that replacement volume will be significant. Refilling the decontaminated production stream will be made more thermally efficient by exchanging the heat in the contamination stream with the replacement water stream thereby lowering the incoming contaminant stream to a safe processing temperature, while reducing the process heat load caused by the contaminant extraction process.

The Contaminants Extraction, Fluid Replacement system consists of the contaminants separator (4) where oils, gases, solids and associated waters are diverted to a separation storage processing station. To prevent the extracted contaminants, at produced fluid circulation pressure and temperature, from boiling, they will flow through a recuperative heat exchanger (5) and be cooled to a near-processable temperature and pressure. The contaminant stream will receive a final cooling, in the event the recuperative heat exchanger cannot lower the temperature of the contaminants sufficiently they will be further cooled by an air-cooled heat exchanger (6). Once directed into the contaminants separation system (7) the contaminants will be separated into various distinct stream: salable oil, gases, solids and reusable water. The reusable water will be then pumped (8) back into the produced fluids stream. Replacement water will be stored (9) and pumped (10), blended with reusable waters and delivered by dedicated piping (11) into the circulating produced fluids, via the Contaminants Extraction recuperative heat exchanger (5) to ensure efficient use of the gathered solar heat present in the circulating systems.

Figure 10:
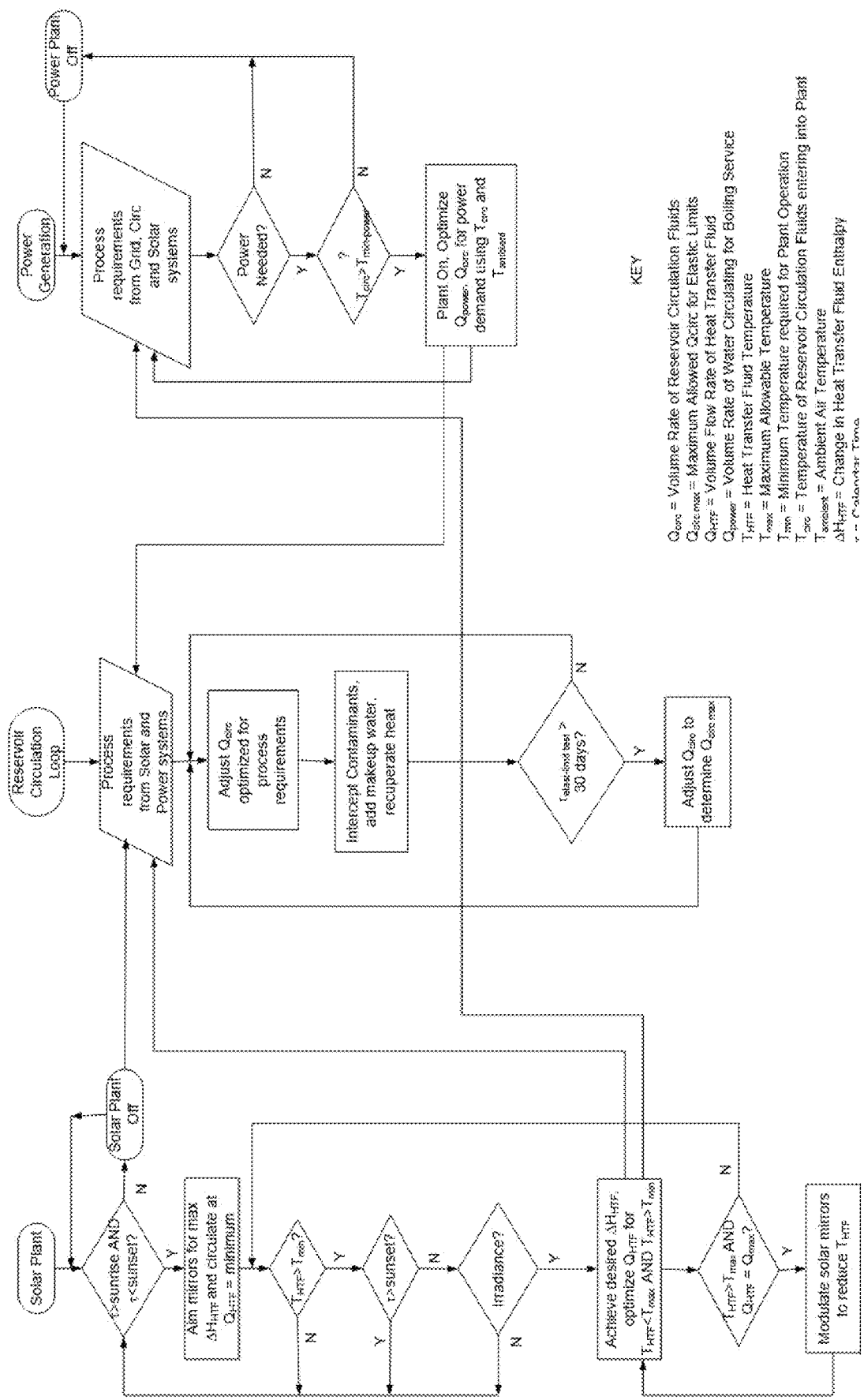
FIG. 10 is a flow chart which illustrates use of a solar heating circulation loop, an electric power loop and a reservoir circulation loop in one embodiment of the present invention.

FIG. 10 illustrates the three flow loops used to deposit and recover heat, collect heat from a solar source and produce power from the collected heat.

The Reservoir Circulation Loop uses the reservoir grain matrix of a naturally-occurring, permeable, porous subterranean reservoir as a means of storing and recovering heat, as manifested by both the mass of fluids being circulated and those fluids' circulating temperature, as well as the grain matrix's mass and temperature. The Reservoir Circulation Loop is operated so that, in an especially preferred embodiment, fluid flows are in balance and flow rates are in balance with either available solar heat to be stored in the reservoir grain matrix and/or with heat required for production of power, as commanded by the Solar Plant and Power Generation loops and optimized to manage the reservoir fluid flow and heat storage capacities. Balance of fluid flows is obtained by balancing injection and production fluid rates to ensure the circulating reservoir fluids require no surface storage and/or to manage reservoir (i.e., grain matrix interstices) pressures. "Balanced" injection and production fluid flows are essentially identical, which means they are deemed as being essentially identical, if not identical, in terms of measurement and control, within the Reservoir Circulation Loop.

The Solar Plant Loop uses time of day and pyranometer (i.e., irradiance) data to govern the collection of solar irradiance energy so that, in an especially preferred embodiment, circulating heat transfer fluid temperatures are sufficiently increased to allow transfer of heat to the Reservoir Circulation Loop fluids, there is optimization of heat transfer fluid temperatures to ensure their safe use, by command of the solar collection reflectors, and a determination of available heat is made to command the Reservoir Circulation Loop to present sufficient mass and temperature to collect said available heat. The Power Generation Loop uses power grid command data to determine if power should be generated for use by the Power Grid. In an especially preferred embodiment, if power is required, a determination of how much power may be produced is made, the Reservoir Fluids Loop is commanded to circulate at a rate optimized to produce the commanded power for best management of the Reservoir Circulating Loop and a determination of the quantity of required power generating fluids (e.g., distilled water) is made and said power generation water circulation is optimized for power generation purposes.

In connection with the above discussions with respect to FIG. 10, the term "optimized" is used to describe the application of optimization methods, typically by linear algebra equations, to find local maxima/minima effects, though other optimization methods may be used for preferred or alternative commercial purposes.

Without in any way intending to limit the scope of the present invention, the present invention includes at least the following embodiments and variations in such embodiments.

1. The use of a porous and permeable reservoir to establish three fluid circulation loops for the purposes of absorbing, storing and recapturing renewable energy to manufacture electric power. The three loops are:

a. Produced fluids circulation loop, which contains:
   i. The reservoir, reservoir fluids source, grains for thermal storage
   ii. The Contaminants and Extracted fluids replacement section.
b. Solar Heating Circulation Loop
c. Electric Power Loop 2. Using the above, loop a and b are associated by a heat exchanger to transfer heat to the reservoir fluid and store heat in the reservoir grains
   Using the above, loop a and c are associated with a heat exchanger to transfer heat to the working fluid in loop c for work to generate electricity.

3. As to embodiment 1a., a process which is controlled to ensure that highly heated reservoirs fluids remain in the liquid state so as to ensure fluid circulation reliability.

4. As to embodiment 1a, a process which is controlled to ensure the reservoir and containment layers stay within their elastic limits.

5. As to embodiment 1a ii, a sealed process which eliminates carbon dioxide and other regulated emissions, unlike those found with other geothermal and non-geothermal power generating processes.

6. As to embodiment 1.c., as above, which can be used and optimized for use with various power generating working fluids and processes for best economic effect, through reservoir temperature management practices.

7. A process which, through the addition of heat and modifying chemicals will result in progressively increasing permeability and porosity, thereby increasing the heat storage and recovery for power generating capacity.

8. As above, where the option exists to use a hydrocarbon occupied reservoir, to enhanced recovery of contaminant oil, for improved commercial benefit.

9. A process which uses renewable heat as it is available, to manage the circulation rates associated with both the heat supply and the heat storage circulation rates for best economic effect, using linear algebra or other preferred solutions optimization practices.

10. A process which uses power demand to recover stored heat in the reservoir to produce power as demand and the stored amount of heat will support for best economic effect, using linear algebra or other preferred solutions optimization practices.

11. A process which uses simultaneous storage and recovery of heat for the purposes of storing heat and the production of electric power for best economic effect, using linear algebra or other preferred solutions optimization practices.

12. A process which selects, separates and recovers for further use, heat storage and heat recovery process-interfering contaminants.

13. A process which is configured to efficiently recover heat which would be otherwise lost in the process of managing reservoir contaminants.

14. A synthetic geothermal process which is non-depleting in production of power when needed, unlike other geothermal processes.

15. A synthetic geothermal process where long duration heat recovery is not depleted by typical conduction limits found with other known geothermal processes.
   a. Long duration can be in the order of 1000 hours of electrical generation.
      i. For when seasonal events limit other renewable direct power sources 16. Wherein in embodiment 3, artificial lift is installed in the producer wells for the purposes of controlling reservoir fluids state.

17. Wherein in embodiment 7, a process controller adjusts Circulation loop 1.a. and 1.b flow rates for variable irradiance collection caused by seasonal effects, or
   weather related effects such as cloud, rain, wind, extreme temperatures.

While the invention has been described herein with reference to certain preferred embodiments, those embodiments have been presented by way of example only, and not to limit the scope of the invention. Additional embodiments and further modifications are also possible in alternative embodiments that will be obvious to those skilled in the art having the benefit of this detailed description.

Accordingly, still further changes and modifications in the actual concepts described herein can readily be made without departing from the spirit and scope of the disclosed inventions.

What is claimed is:

1. A system for storing and recapturing renewable energy to manufacture electric power, comprising:
   a solar heating circulation loop configured with a solar power plant to provide an injectant liquid after it has been heated;
   a naturally occurring, permeable, porous subterranean reservoir configured with constituent reservoir grain matrix and a reservoir liquid;
   an electric power loop configured with an electric power plant to manufacture electric power from a recovery liquid; and
   an array of injection and producing wells configured to deliver heat into the naturally occurring, permeable, porous subterranean reservoir by the injectant liquid and recover heat from the naturally occurring, permeable, porous subterranean reservoir by the recovery liquid;
   wherein injectant delivery rates are managed to keep an injection process within elastic limits of the naturally-occurring, permeable, porous subterranean reservoir and prevent flashing of the injectant liquid;
   wherein liquid injectant delivery rates are balanced with liquid recovery delivery rates;
   wherein heat is transferred from the solar power plant and stored in the naturally occurring, permeable, porous subterranean reservoir and subsequently recaptured from the naturally occurring, permeable, porous subterranean reservoir and converted into electric power by the electric power plant; and
   wherein the naturally occurring, permeable, porous subterranean reservoir has an increased porosity of at least 10% between at least one injection well and one producing well created by repeated (a) injection of injection liquid into the naturally occurring, permeable, porous subterranean reservoir and (b) recovery of recovery liquid from the naturally occurring, permeable, porous subterranean reservoir.

2. The system of claim 1, wherein the naturally occurring, permeable, porous subterranean reservoir has been heated from an initial temperature to an elevated reservoir temperature by the injection process and the elevated reservoir temperature supports power generation from the recovery liquid.

3. The system of claim 2, wherein the elevated reservoir temperature is in excess of approximately 500° F.

* * * * *